US006776074B1

(12) United States Patent
Tisi

(10) Patent No.: US 6,776,074 B1
(45) Date of Patent: Aug. 17, 2004

(54) APPARATUS AND METHOD FOR HANDLING FLEXIBLE TUBES

(75) Inventor: Antony Luigi Paul Tisi, Benfleet (GB)

(73) Assignee: Philton Polythene Converters Limited (GB)

( * ) Notice: Subject to any disclaimer, the term of this patent is extended or adjusted under 35 U.S.C. 154(b) by 241 days.

(21) Appl. No.: 09/890,878

(22) PCT Filed: Nov. 30, 2000

(86) PCT No.: PCT/GB00/04577

§ 371 (c)(1),
(2), (4) Date: Aug. 3, 2001

(87) PCT Pub. No.: WO01/39939

PCT Pub. Date: Jun. 7, 2001

(30) Foreign Application Priority Data

Dec. 4, 1999 (GB) .............................................. 9928641

(51) Int. Cl.[7] .............................................. B23D 21/00

(52) U.S. Cl. .............................. 83/23; 83/181; 83/182; 83/184; 83/185; 83/186; 83/189; 53/457

(58) Field of Search ...................... 83/178–195; 53/409, 53/441, 442, 452, 457, 459, 463, 468, 476, 477

(56) References Cited

U.S. PATENT DOCUMENTS 1,753,645 A * 4/1930 Camfield ..................... 83/426
2,110,856 A * 3/1938 Gardner et al. .......... 242/542.2
2,644,522 A * 7/1953 Parker et al. ................ 29/2.14
2,895,596 A * 7/1959 Kuypers ..................... 414/431
3,026,599 A * 3/1962 Leff .......................... 29/2.16
3,114,193 A * 12/1963 Lynam ...................... 29/2.17
3,581,614 A * 6/1971 Catallo ........................ 83/184
3,703,116 A * 11/1972 Doll ............................ 83/186
3,738,210 A * 6/1973 Fujio ........................... 83/175
3,893,213 A * 7/1975 Rockman et al. ............. 83/365
3,926,015 A * 12/1975 Sangiacomo .............. 66/149 S
4,131,979 A * 1/1979 King et al. ................... 83/180
4,413,575 A * 11/1983 Gazzarrini .................. 83/175
4,592,260 A * 6/1986 Gabathuler et al. ........... 83/187
4,658,484 A * 4/1987 Morishita et al. ............. 83/175
5,083,351 A * 1/1992 Gabathuler et al. ........... 83/175
6,032,439 A * 3/2000 Birkenfeld et al. ........... 53/441
6,308,855 B2 * 10/2001 Tisi ....................... 220/495.01

* cited by examiner

*Primary Examiner*—Allan N. Shoap
*Assistant Examiner*—Jason Prone
(74) *Attorney, Agent, or Firm*—Renner, Kenner, Greive, Bobak, Taylor & Weber

(57) ABSTRACT

Apparatus for and a method of handling flexible tubes, for example in the production of a liner for a cargo container to provide a tubular attachment on the liner. A tube 16 in the form of a web of flexible material is drawn over a support 39 mounted on a carrier 29,30, the support having a greater area than that of the opened-out tube and being tilted to the radial plane (FIG. 2) during the drawing action. The support is then moved to the radial plane (FIG. 4) so as to stretch the tube 16 in the region of the support whereafter the tube is cut from the web, in the vicinity of the support. The support 39 is moved to a further processing station (FIG. 8), carrying the cut off tube 16, whereat the tube is released from the support 39 by tilting the support once more and withdrawing the support from the tube. The support is then returned to its initial position ready for another cycle of operation.

21 Claims, 17 Drawing Sheets

APPARATUS AND METHOD FOR HANDLING FLEXIBLE TUBES

FIELD OF INVENTION

This invention relates to apparatus for handling a tube of flexible plastics material cut from a web of that material. The invention further relates to a method of handling such a tube, for the further processing thereof.

The apparatus and method of this invention are particularly concerned with the manufacture of container liners and will in the following be described essentially solely in relation to that manufacturing process. It is however to be understood that the invention is not limited to that manufacturing process and aspects of the apparatus and method may equally be used in other processes.

BACKGROUND OF THE INVENTION

Liners for cargo containers, such as ISO box containers, are well-known and widely used for the bulk transport of flowable products—for example granular materials including agricultural produce and chemicals. Such liners are usually made from plastics sheet material which is preformed into a tube, or from sheet material which is suitably folded and subsequently is seam-welded to make a tube. End panels for a liner are provided either by welding the plastics material in an appropriate manner or by bonding into the tube a separate end panel. Access openings are provided both for the loading and discharge of the liner, when in use, and such openings frequently are fitted with access pipes—for example for the introduction of the product into the liner. Further, suitable arrangements must be made for the suspension of the liner in a container.

The manufacture of such a container liner tends to be somewhat labour intensive. Typically, a web of the plastics material is supported adjacent a work-table and is drawn out over that work-table so that the required operations may be performed by operators reaching across the liner and using suitable tools, such as thermal welding apparatus. In view of the width of such a liner, these operations are not very easy to perform in the central region of the liner where, for example an access pipe must be bonded to the liner, around an access opening formed through the material of the liner. A high degree of skill is required to ensure the bonding process, such as thermal welding, is carried out efficiently to provide a reliable joint which will not fail in use.

SUMMARY OF THE INVENTION

The present invention stems from research into ways for facilitating the handling of a plastics material tube which is to form the access pipe of a completed liner, and so which must be cut from a web of flexible plastics material and then bonded to a liner, around an opening pre-formed therein. The access pipe may be made of relatively thin-wall plastics material and so is not self-supporting; this leads to particular difficulties in handling the tube both at the time of cutting a suitable length from the web and subsequently to shape and bond the tube to the liner, to form the access pipe.

According to one aspect of the present invention, there is therefore provided apparatus for handling a tube of flexible plastics material drawn and then cut from a web thereof, which apparatus comprises a disc-shaped support having a greater diameter than the internal diameter of the tube and over which the material is drawn, and a carrier for the support, in which apparatus the support is mounted on the carrier for movement between a first position where the support lies at an angle to a radial plane of the tube to permit drawing of the tube thereover and a second position where the support lies substantially in a radial plane of the tube so that the part of the tube in which is located the support is stretched over the support and so is held thereby.

According to a second and closely related aspect of the present invention, there is provided a method of handling a tube of flexible plastics material using a disc-shaped support having a greater diameter than the internal diameter of the tube when opened out and being adjustably mounted on a carrier for movement between a first position where the support lies at an angle to a radial plane of the tube and a second position where the support lies substantially in a radial plane of the tube, in which method the support is disposed at its first position, a length of the tube is drawn over the support from a web thereof, the support is moved to its second position so that the part of the tube in which is located the support is stretched over the support and so is held thereby, and the drawn length of the tube is cut from the web, adjacent the support.

By using the apparatus of this invention, or performing the method of this invention, it becomes possible to handle on an automated basis a tube of relatively flexible, or "floppy", plastics material to form an access pipe for a container liner. Despite the nature of the plastics material, a required length of the tube may be cut from the web and then be transferred to a bonding station where the tube is bonded to the material of the liner, around an opening pre-formed in the liner, without the need for intervening manual operations.

The handling of the floppy tube is possible in view of the movement of the support between its first and second positions—the support should have an effective projected area of no greater than the area of the tube (when opened out into a circular shape) when the support is in its first position, but has an effective area greater than the area of the tube when the support is in its second position. Thus, the material may be drawn over the support relatively easily so as to have the support positioned within the tube adjacent one end thereof, when the support is in its first position, but the tube is held firmly, in its opened-out configuration, when the support is in its second position.

Preferably, the support is moveable to a third position inclined at an angle to the radial plane of the tube and beyond the second position with respect to the first position. In this case, the movement of the support from the first position may go through the second position to the third position before finally returning to the second position. Such "over-running" of the support by a few degrees ensures that the material of the tube is not unduly stretched locally when the support finally is in its second position, and that the support is properly located in the tube, in a radial plane, at the time the tube is cut from the web.

Conveniently, the carrier is mounted on a sub-frame, arranged for movement of the support from a loading position where the tube is drawn over the support, to a discharge position where a cut length of tube is subjected to a further processing step—for example, the cut length is bonded to a container liner under manufacture.

The support itself may be in two parts, having an auxiliary disc connectable co-axially to the support and selectively releasable therefrom. For example, an electromagnet mounted on the support or auxiliary disc may be provided to allow such connection and release. The auxiliary disc preferably has a diameter no greater than that of the support, but may be smaller. In the latter case, it is advantageous for the area of the auxiliary disc to be substantially the same as that of the tube, when opened out.

The tube cutter preferably acts on the tube at a position adjacent the support when in its second position. Such a tube cutter may comprise at least one blade arranged for rotational movement about the tube, so as to effect a circumferential cut through the tube. For a two part support, the cutter preferably acts to cut the tube between the two parts. Either an externally-acting cutter or a cutter arranged between the two parts of the support, to act internally of the tube, may be employed.

A gripper mechanism may be mounted for vertical movement on the carrier, which gripper mechanism is arranged for gripping an end portion of the tube and then to draw the tube over the support prior to the cutting of the tube. Such a gripper mechanism may have an annulus surrounding the support and provided with gripping fingers or other clamps, to grasp the end portion of the tube.

BRIEF DESCRIPTION OF THE DRAWINGS

By way of example only, one specific embodiment of tube handling apparatus constructed and arranged in accordance with the present invention and configured to perform a method of this invention, and certain modifications thereof, will now be described in detail, reference being made to the accompanying drawings, in which.

DETAILED DESCRIPTION OF THE INVENTION

Figure 1:
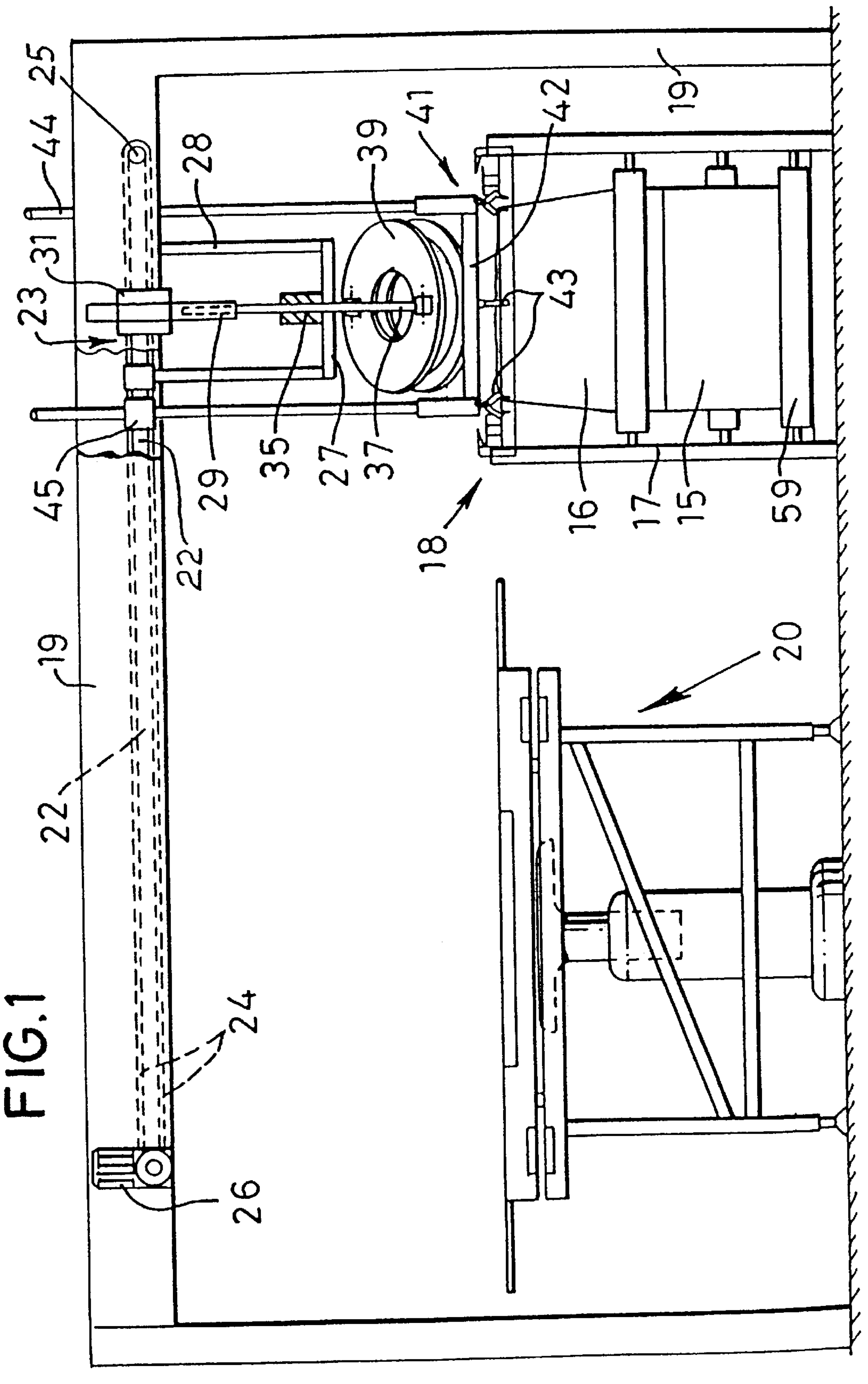
FIG. 1 is a diagrammatic end view on the embodiment of apparatus, with that apparatus in an initial setting ready to perform a tube handling cycle, of cutting a length of tube from a web and then bonding the cut length to a sheet of plastic material around an opening therein, so as thereby to form an access pipe for a container liner being manufactured from said sheet.
Figure 2:
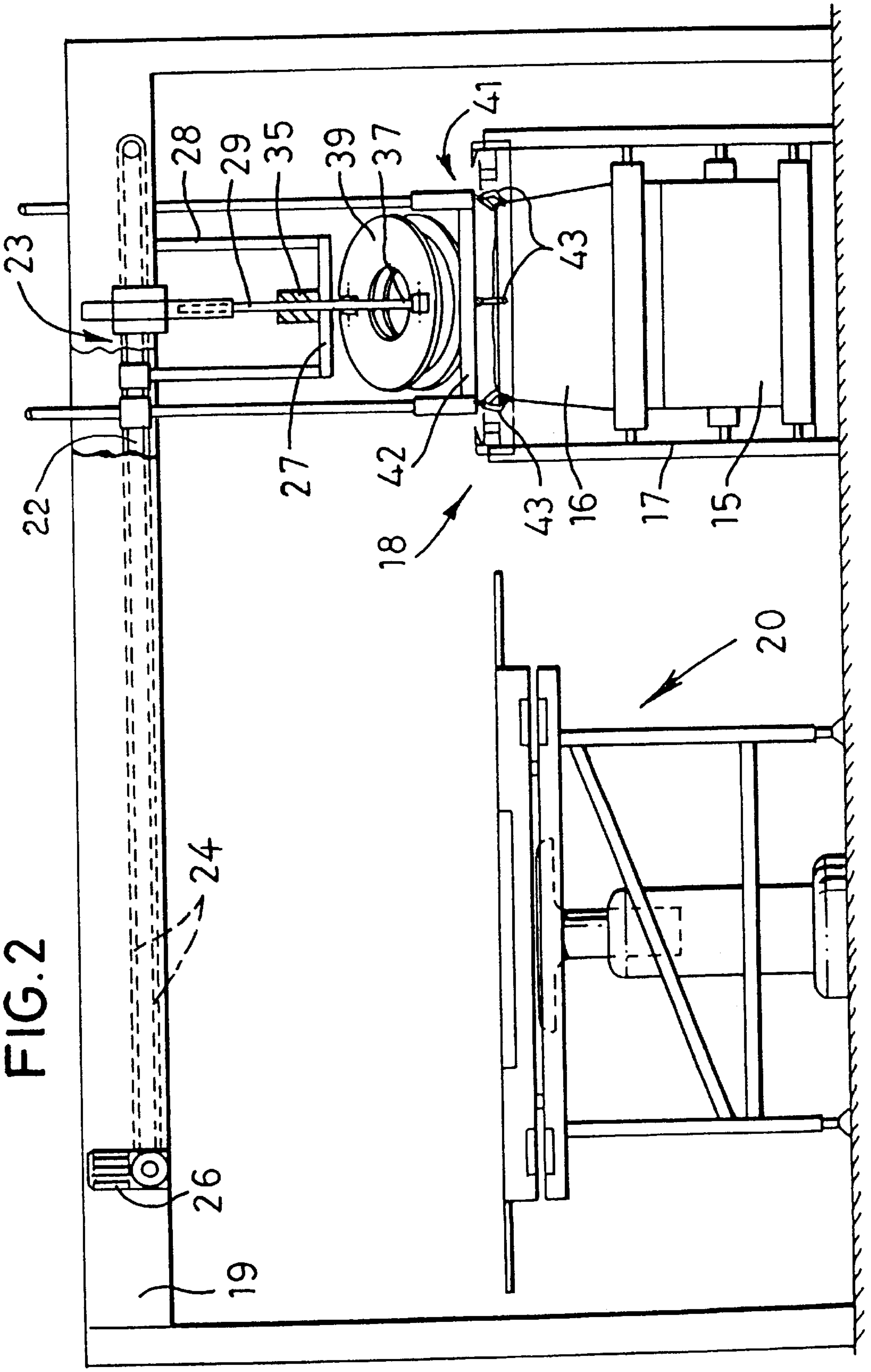
FIGS. 2 to 9 show successive steps in the tube handling cycle performed by the apparatus of FIG. 1.
Figure 3:
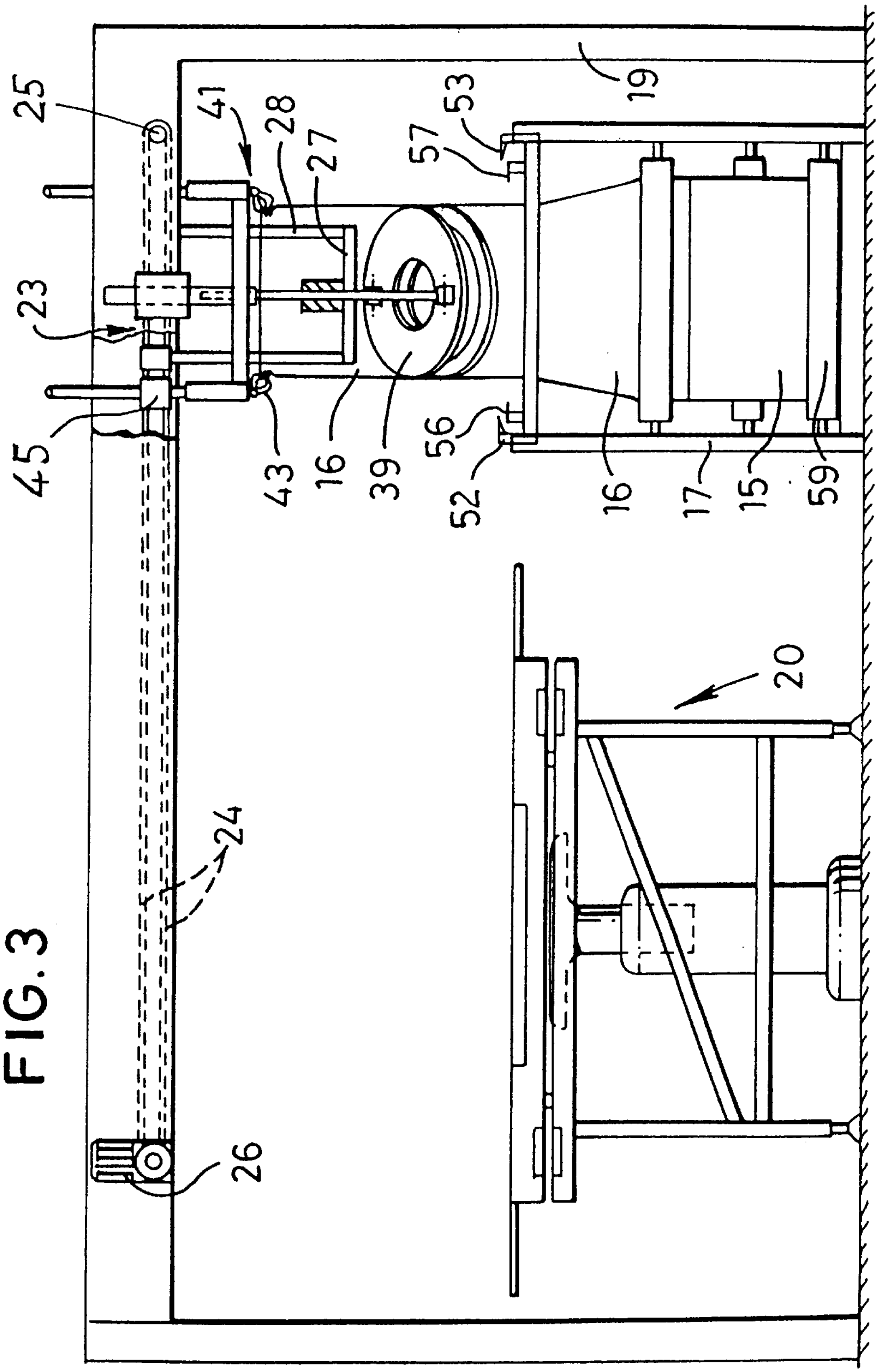

Referring initially to FIG. 1, there is shown the embodiment of apparatus of this invention for performing a tube handling method, also of this invention. In addition, the drawings show part of apparatus for manufacturing a cargo container liner, so that an access pipe may be provided thereon, that access pipe being formed by the tube handling method described herein.

A reel 15 of folded-flat plastics material tube 16 is supported on a frame 17 having an upper work area 18, and to which the tube 16 is fed during initial setting up of the apparatus. An overhead gantry 19 extends over the frame 17 as well as the work table 20 of an automated liner-manufacturing production line. There, a length of liner plastics tubular material is drawn out over the work table 20 in order that various manufacturing processes may be performed thereon, including the attachment of a length of tube 16 to form an access pipe for a finished container liner. Apart from this step, the manufacturing process for the liner forms no part of the present invention and will not be described in further detail here.

The gantry 19 has a track 22 along which runs a carriage 23. An endless chain 24 is arranged alongside the track 22, passing round a pulley 25 at one end of the track and round a drive wheel on the output shaft of an electric motor 26 at the other end. The carriage 23 is coupled to the chain so as to be moved along the track on operation of the motor, between a first position (FIG. 1) above the frame 17 and a second position (FIG. 6) above the work table 20, at appropriate times during the performance of the method.

Figure 14:
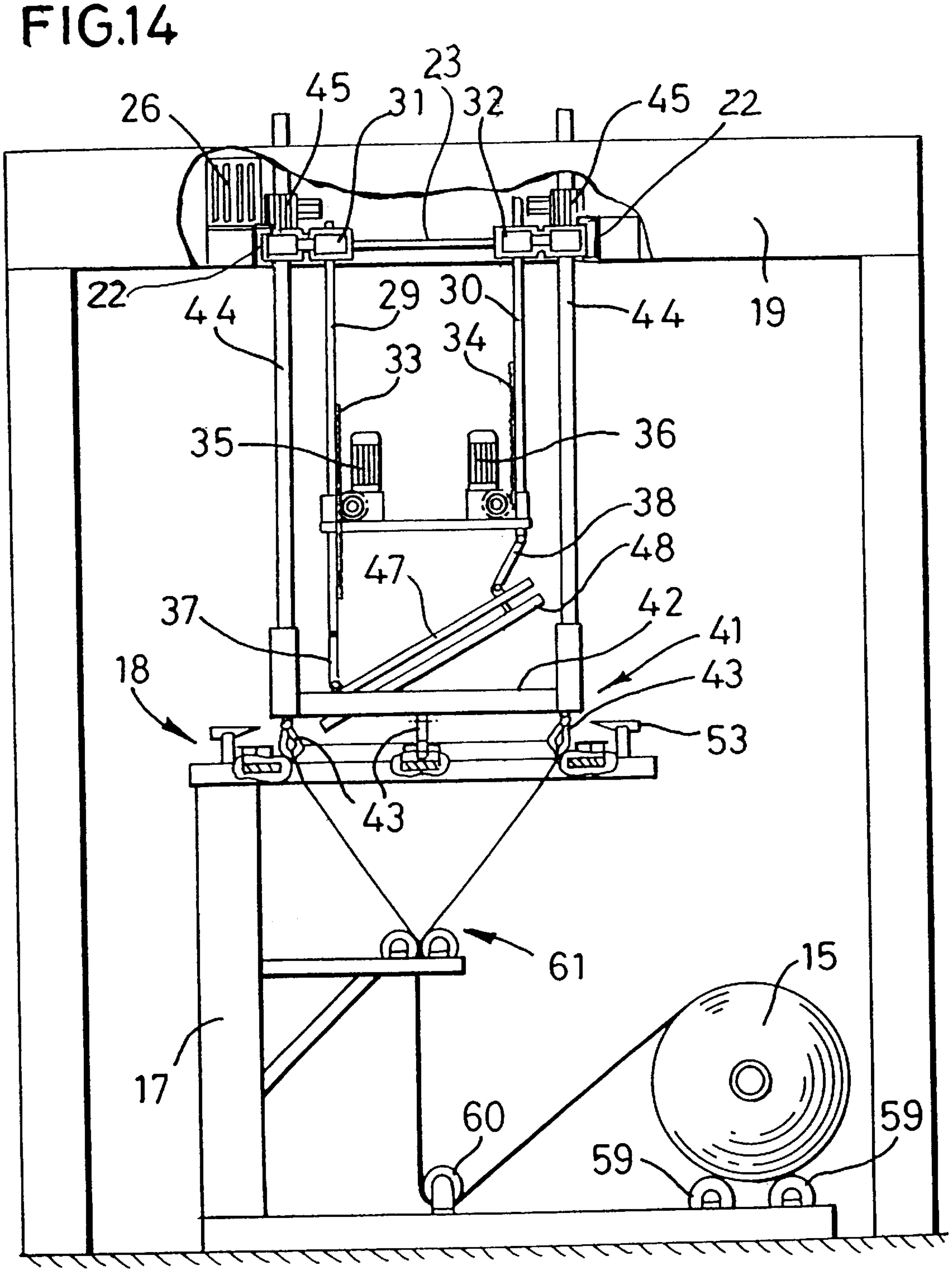
FIG. 14 is a side view on part of the apparatus shown in FIGS. 1 to 9.
Figure 15:
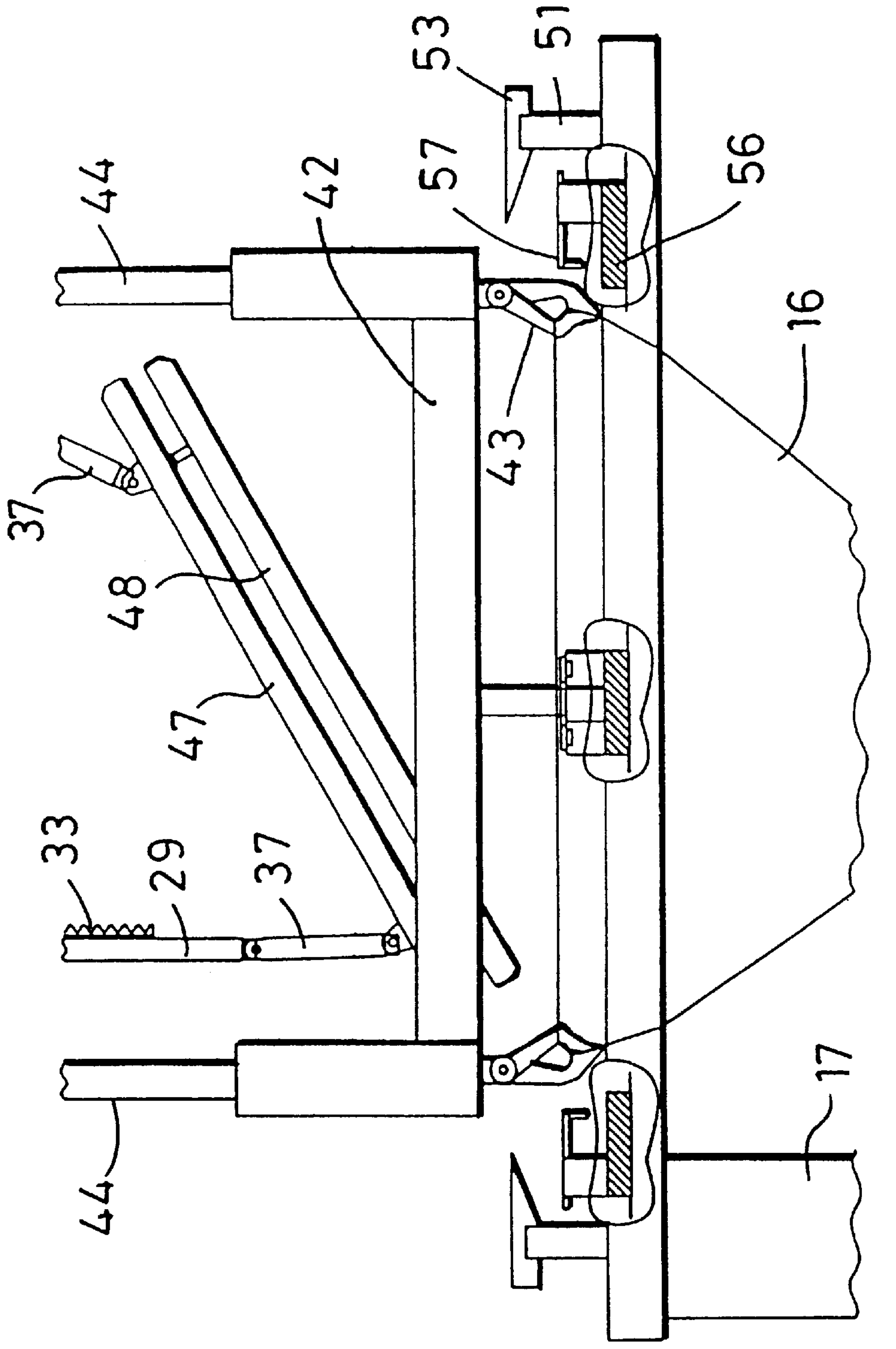
FIG. 15 is a detail view on the tube support and gripping arrangement used in the apparatus of FIG. 14.

The carriage 23 includes a platform 27 suspended below the track 22 by bars 28, the platform slidably mounting a pair of arms 29 and 30, which also pass through guides 31 and 32 provided in the carriage, at the level of the track 22. The two arms 29, 30 have respective toothed racks 33, 34, each engaged with a respective driving pinion provided on the output shaft of an individually controllable motor 35, 36 mounted on the platform 27. The lower ends of the arms 29, 30 are provided with articulated links 37, 38 coupling the arms to a disc-shaped support 39, described in more detail below, at diametrically opposed locations. By appropriate driving of the motors 35, 36, the support 39 may be moved between an inclined (first) position shown in FIGS. 1, 14 and 15 and a horizontal (second) position shown in FIGS. 4 and 9.

Figure 5:
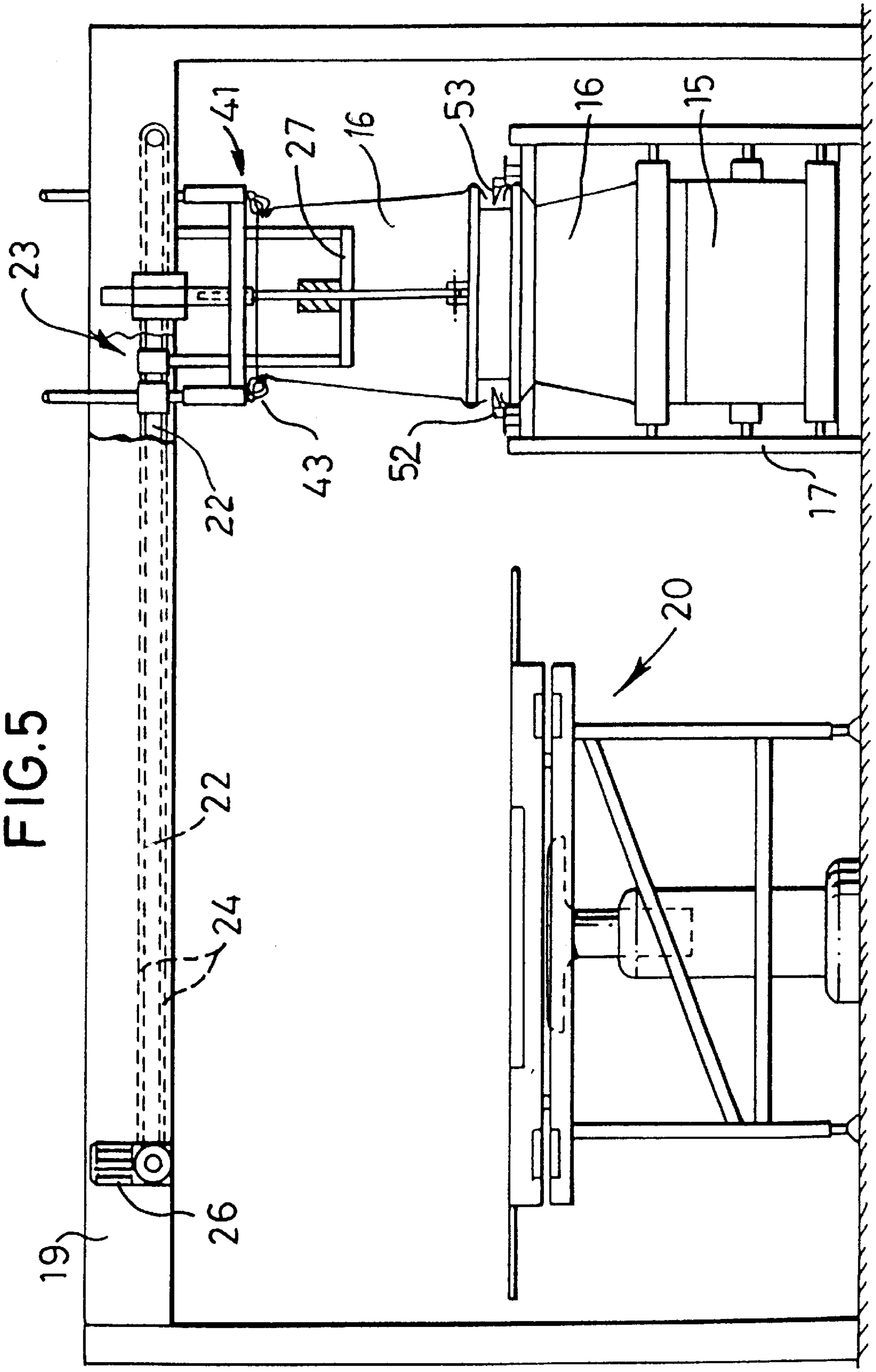
Figure 6:
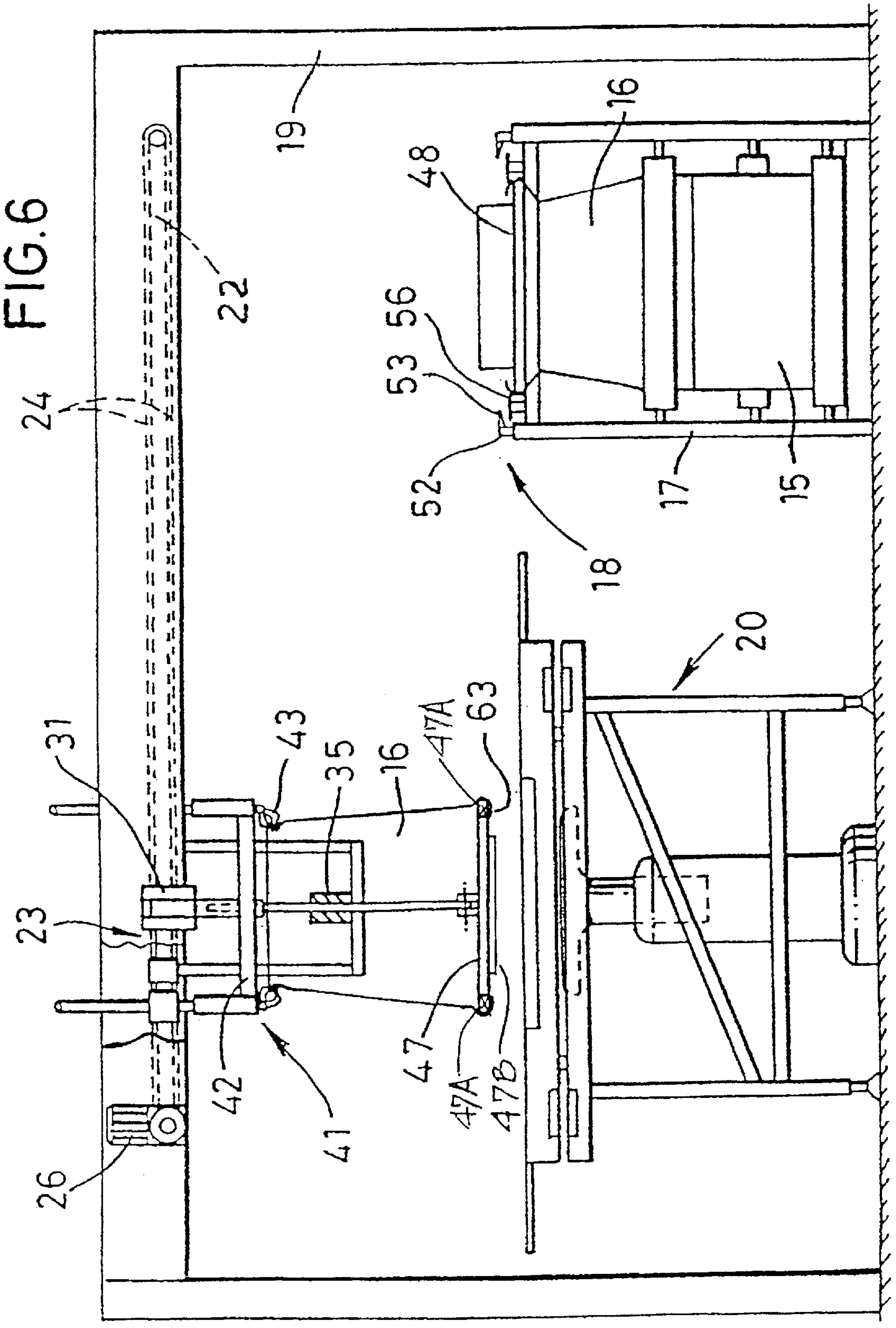
Figure 7:
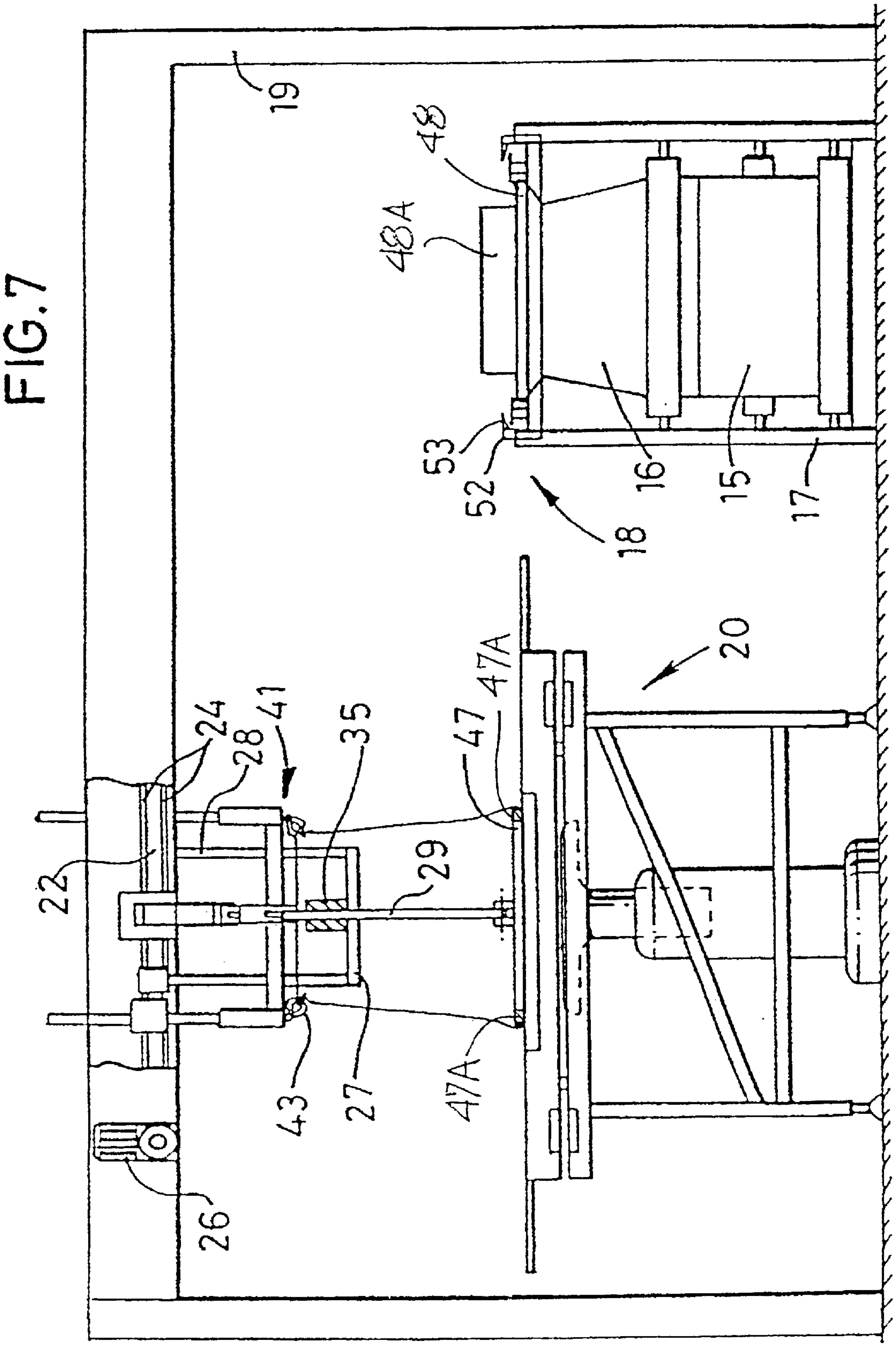
Figure 8:
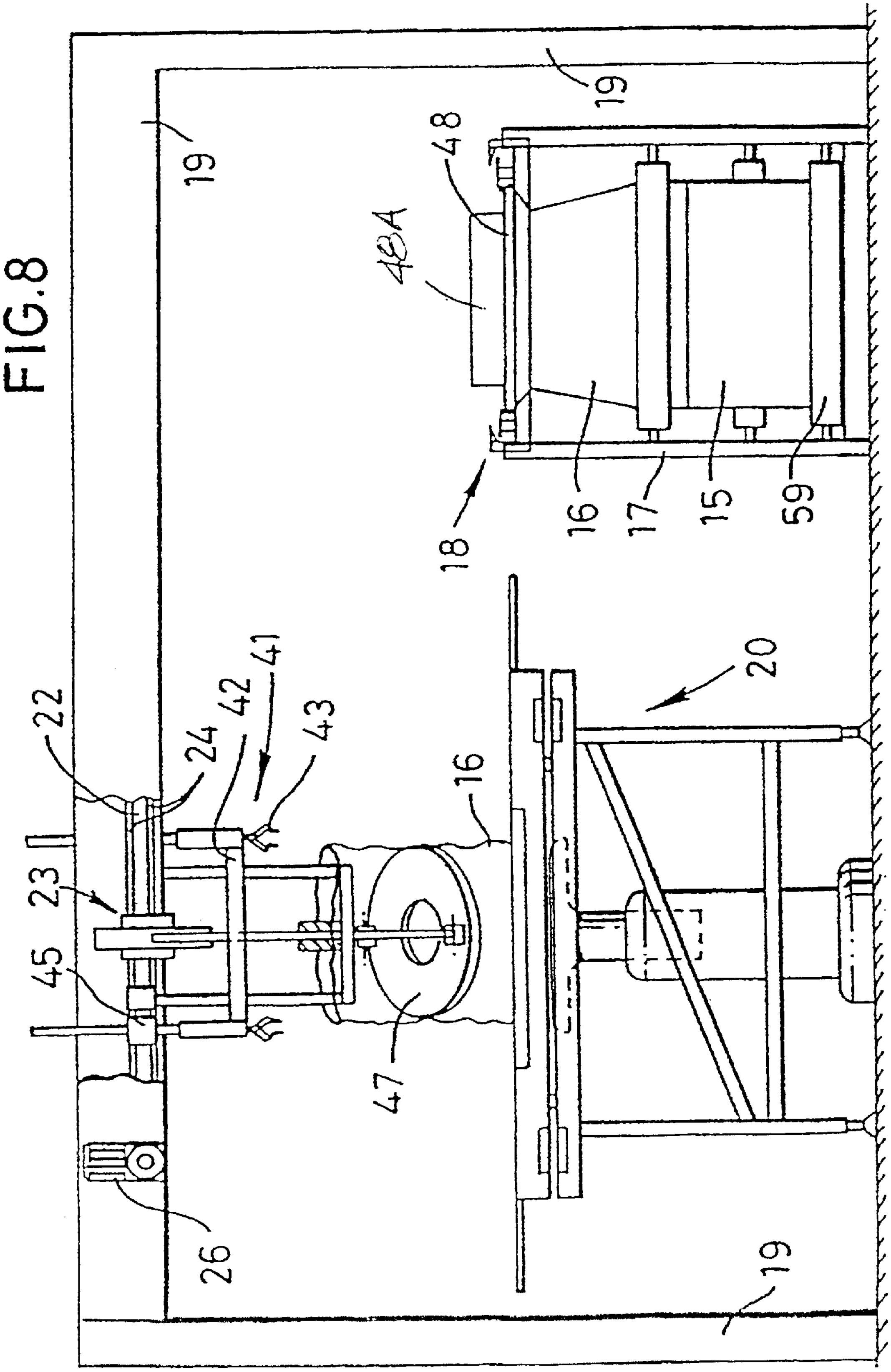

The arms 29, 30 together with guides 31, 32 and racks 33, 34 comprise a carrier for the support 39. The carriage 23, bars 28 and platform 27 carrying the motors 35, 36 and guides 31, 32 together comprise a sub-frame supporting the carrier and movable between a loading position (FIGS. 1 to 5) and a discharge position (FIGS. 6 to 8).

A gripper assembly 41, comprising an annulus 42 from which depends a plurality of gripper fingers 43, is suspended below the carriage 23 on legs 44, for vertical movement. The annulus is of a greater diameter than the support 39 and platform 27, so that the annulus may move thereover, a suitable drive arrangement including motors 45 engaged with the respective legs 44 being provided on the carriage to effect such vertical movement. Further actuators (not shown) for the fingers 43 are provided so that the fingers may be opened and closed, when required.

The support 39 has a main upper part 47 and an auxiliary lower part 48, both parts being disc-shaped and having central aperture 49 extending therethrough. An electromagnet 48A is provided in an upstand of the lower part 48 so that when energized the upper part 47 is held securely to the lower part, but when not energized, the upper part may be moved away from the lower part. Means (not shown) are provided to ensure accurate co-axial alignment between the upper and lower parts 47 and 48, when held together by the electromagnet 48A. Such means may comprise inter-engaging pegs and sockets on the two parts, with those pegs and sockets being given appropriate leads to facilitate inter-engagement. Alternatively, a servo-drive arrangement may be used to obtain registration between the-two parts.

The diameter of the upper part 47 is greater than the internal diameter of the tube 16 with which the apparatus is to be used, so that when the tube overlies the upper part 47 with that part in a radial plane of the tube, the tube is radially stretched over the upper part. However, by sufficiently inclining the support 39 at an angle to the axis of the tube, as shown for example in FIG. 3, the effective (projected) area of the upper part may be reduced to that of the opened-out tube, so that the tube 16 may easily be drawn from the reel 15 by the gripper assembly 41 to pass over the support, without the tube being stretched.

The diameter of the lower part 48 in general should not be greater than the diameter of the upper part 47, and in the illustrated embodiment is essentially of the same diameter. The diameter of the lower part could be slightly smaller than that of the upper part and possibly even smaller than the diameter of the tube, when opened out. In this case, the tube will not be stretched when it overlies the lower part 48 so that there will be no tendency for the free end of the tube, following severing of the drawn length and which projects above the lower part resiliently to curl inwardly. In turn, this assists the gripping of the free end of the tube, by the gripper fingers 43.

The work area 18 of the frame 17 supports a pair of concentric rails 51, with the diameter of the inner rail being sufficiently large to accommodate the support 39. A pair of carriers 52 are mounted on the rails 51 in a diametrically opposed relationship, each carrier having a cutting blade 53 slidably mounted thereon for movement in the radial direction. When the blades 53 are moved radially inwardly and the carriers moved around the rails 51, a circumferential cut will be made around tube 16 between the two parts 47,48 of the support 39, when located horizontally within the inner rail 51.

Figure 11:
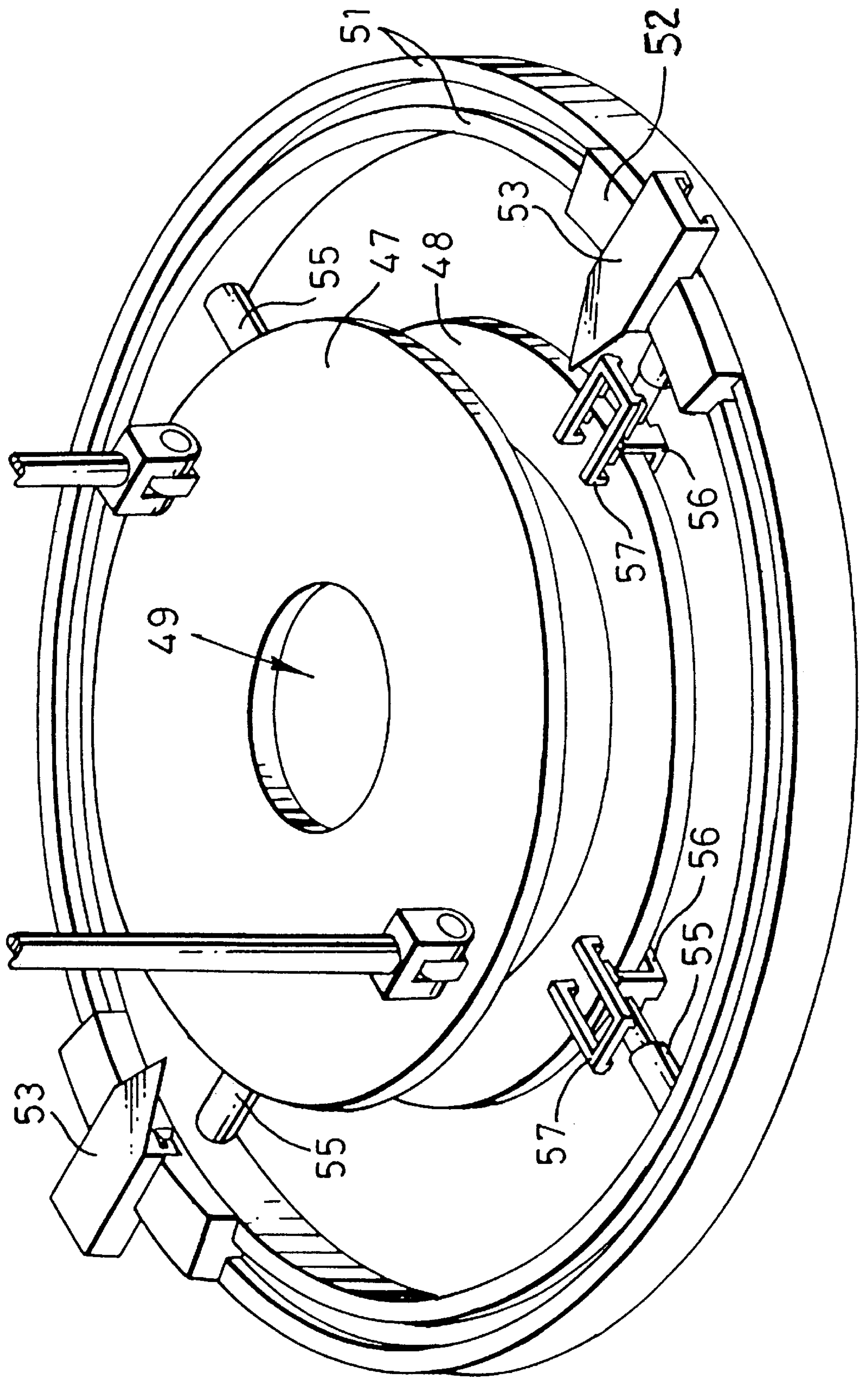
FIG. 11 is a view similar to that of FIG. 10 but in a second position.
Figure 12:
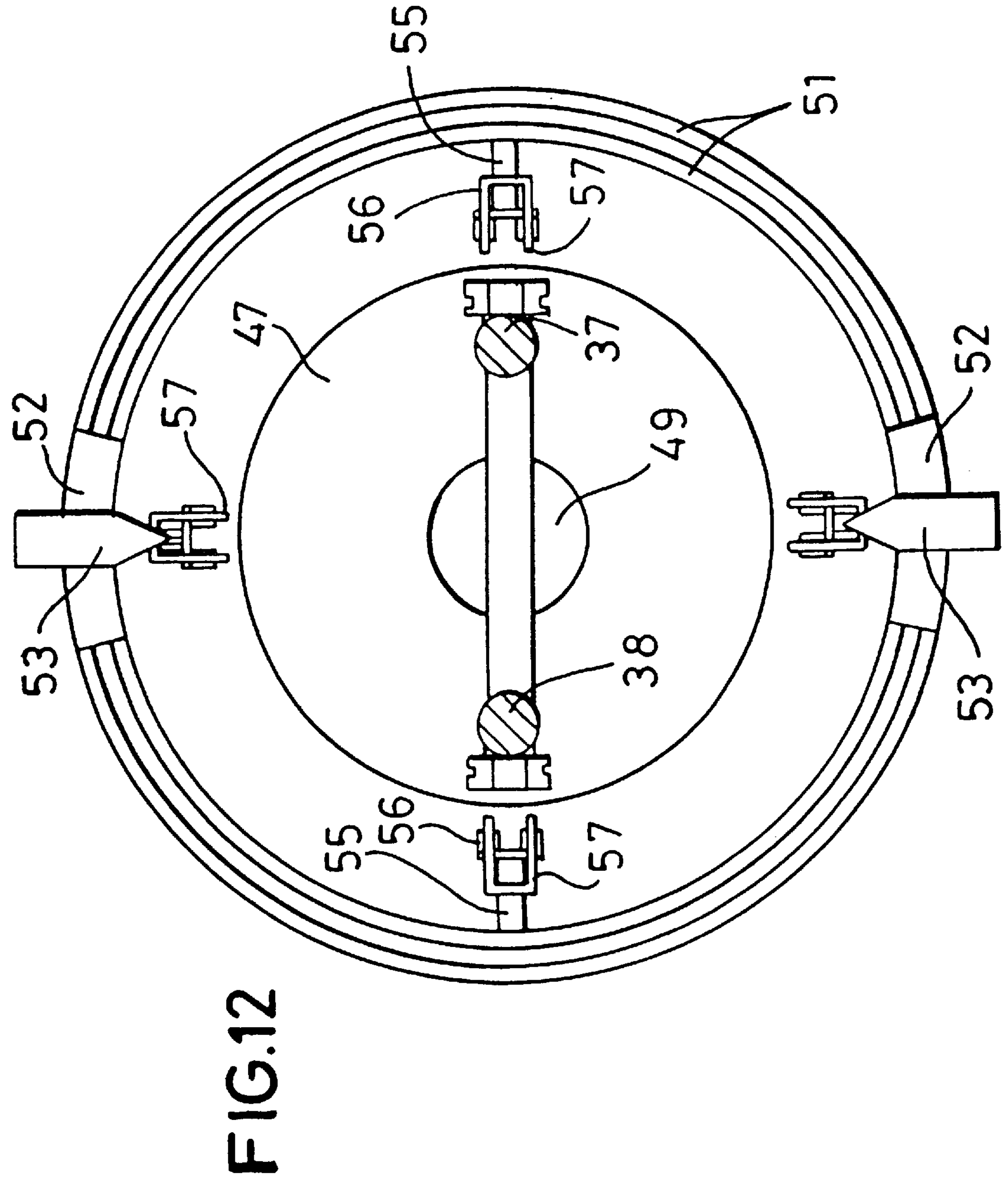
FIGS. 12 and 13 are plan views on the assemblies of FIGS. 10 and 11, respectively.
Figure 13:
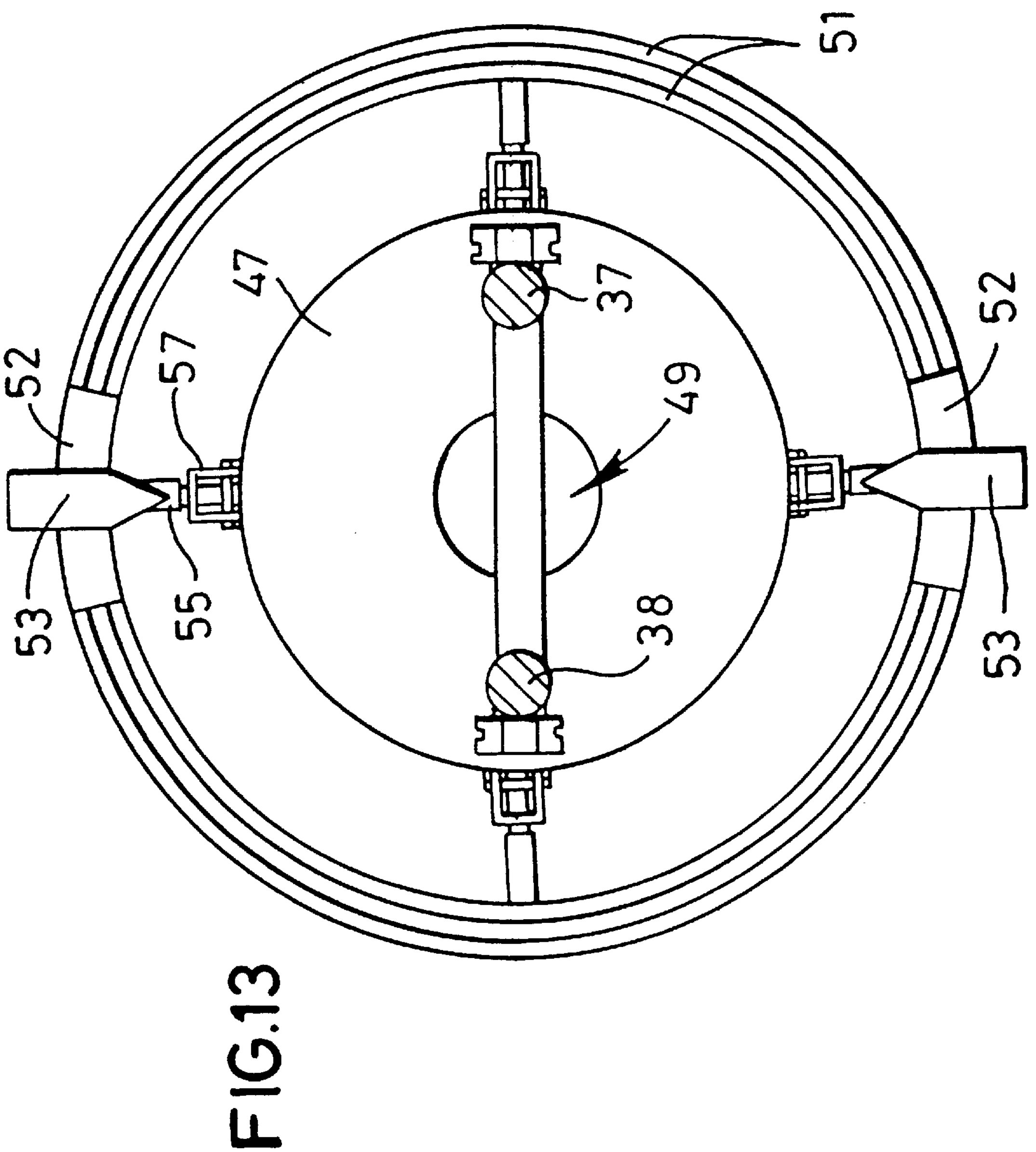

Four rams 55 (FIGS. 10 to 13) are equi-spaced around the inner rail 51, each ram acting in the respective radial direction. Each ram has a clamp jaw 56 at its radially inner end, whereby the lower part 48 of the support 39 may be clamped thereby, following the positioning of the support 39 on the work area 18 as shown in FIG. 11. Further, each clamp jaw 56 is provided with a movable finger 57 the radially inner end of which may be moved generally vertically. For this purpose, an electromagnetic actuator may be provided on the jaw 56, to cause the finger to rock about the horizontal axis.

The operation of the apparatus will now be described. A reel 15 of folded-flat plastics material tube 16 is placed on rollers 59 provided at the base of the frame 17 and the tube is then fed round a jockey roller 60 and through a roller nip 61 to the work area 18 at the top of the frame 17, the tube being opened out into a generally circular form. During initial setting up, the motors 35, 36 are driven so that the support 39 (with the upper and lower parts 47,48 thereof secured together) lies at the angle shown in FIGS. 1, 2 and 14 and so has an effective area, projected in the vertical direction, of about the same area as (but not greater than) that of the opened-out tube. The gripper assembly 41 is lowered to the work area 18 and the fingers 43 operated so as to grip the upper marginal region of the tube 16. This initial setting of the apparatus and tube is as shown in FIGS. 2, 14 and 15, FIG. 1 showing the fingers in their open position, ready for gripping the tube.

Figure 4:
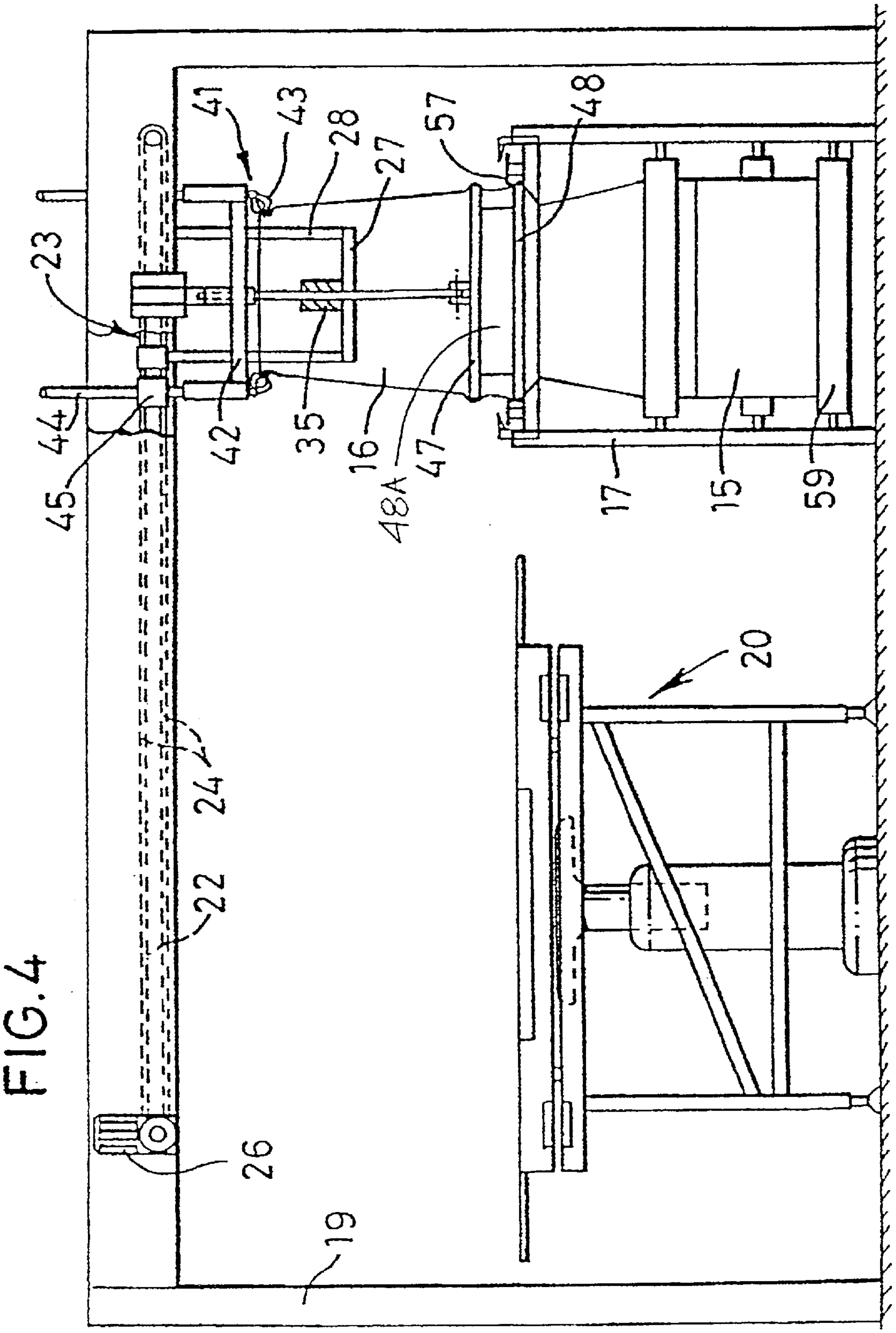

The gripper assembly 41 is then pulled upwardly (FIG. 3) by motors 45, drawing the tube 16 over the inclined support 39. A suitable length of tube for the required access pipe of the liner is drawn from the reel 15, by controlling the upward movement of the gripper assembly 41. The motors 35 and 36 are appropriately driven to lower the support 39 down to the work area 18 of the frame 17 and, as the support reaches that area, the angle of the support is moved to and then slightly beyond the horizontal position by a few degrees, before being pulled back to the horizontal position (FIG. 4).

Figure 18:
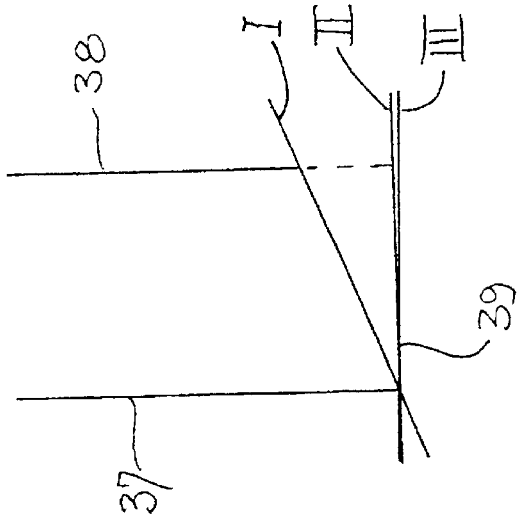
FIG. 18 diagrammatically illustrates the first, second and third positions of the support.

FIG. 18 diagrammatically shows the support in its first position I, its second position II and its third position III.

Once horizontal, the support 39 is clamped in that position by driving the rams 55 to engage the clamp jaws 56 with the lower part 48 of the support. The tube 16 is then cut between the upper and lower parts of the support 39, by moving the blades 53 radially inwardly and driving the two carriers 52 for at least 180°, so that the blades 53 perform a circumferential cutting operation around the tube 16. This severs the part of the tube drawn over the support from the main part of the web of the tube (FIG. 5). If stretching of the tube over the lower part of the support occurs, the cut free edge region of the tube will tend to spring inwardly. The movable fingers 57 on the clamp jaws 56 are operated so as to engage behind that cut edge and hold it against further inward movement.

The electromagnet of the support is de-energised and the upper part 47 is lifted slightly and then moved away from the lower part, by horizontal movement of the carriage 23 until the upper part overlies the work table 20 of the liner manufacturing production line (FIG. 6). The short length of tube 16 below the upper part 47 of the support is able to relax and so curls inwardly to form a flange 63, with the adjacent tube extending over the upper part 47 of the support being stretched.

In FIG. 7, the upper part 47 of the support is shown lowered by the motors 35, 36 to engage a plastics material liner being manufactured on the work table 20. A thermal welding arrangement such as an annular heater 47A is included in the upper part 47 of the support 39, but could instead be incorporated within the work table 20, whereby the flange 63 is thermally welded to the liner on the work table. Other bonding technique could be used such as chemical welding or use of an adhesive.

As shown in FIG. 6, an annular blade 47B may be mounted on the under surface of the upper part 47 of the support, to cut an opening through the plastics material liner being manufactured on the work table 20, the flange being welded to that liner around the opening.

Figure 9:
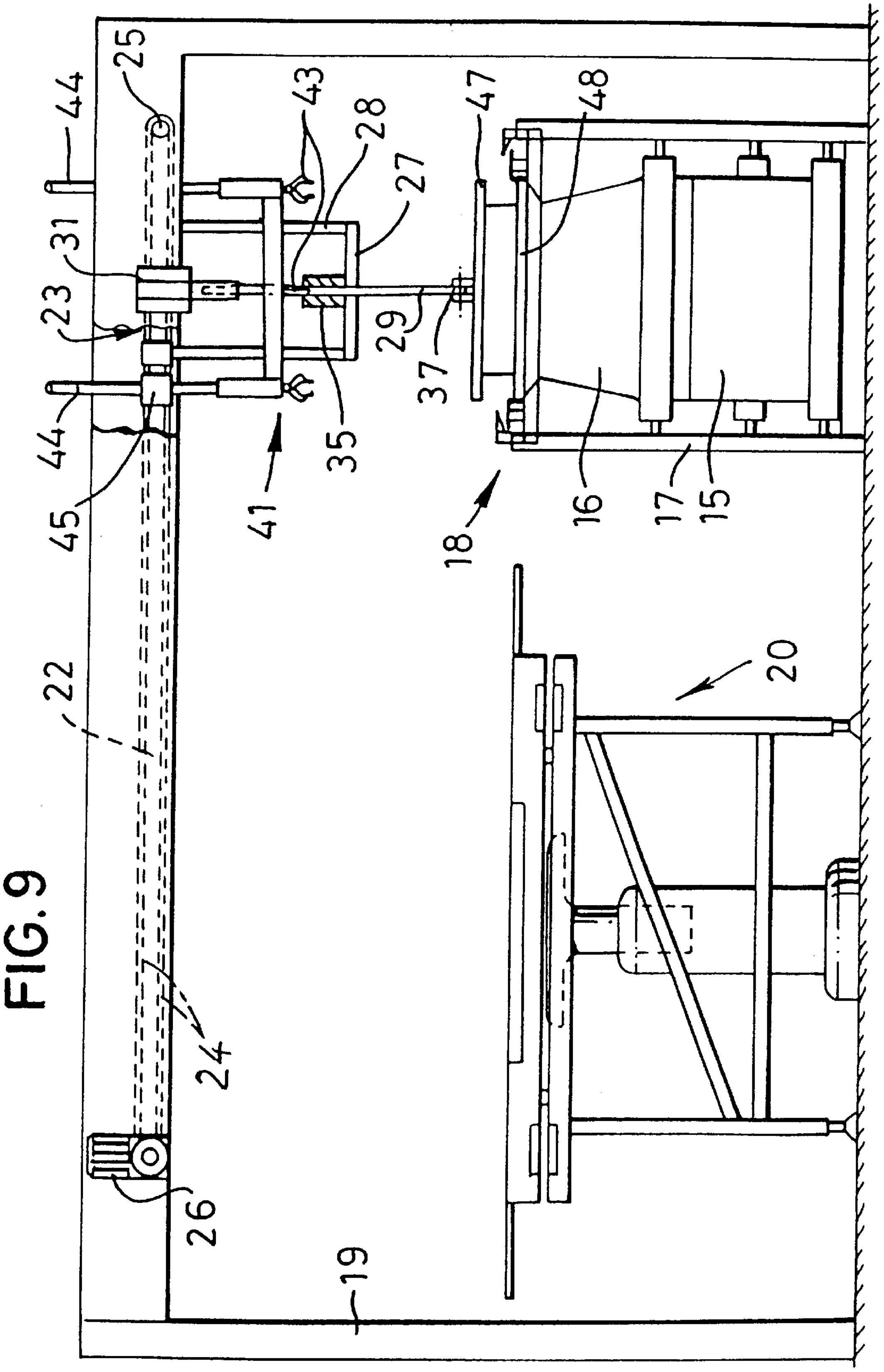
Figure 10:
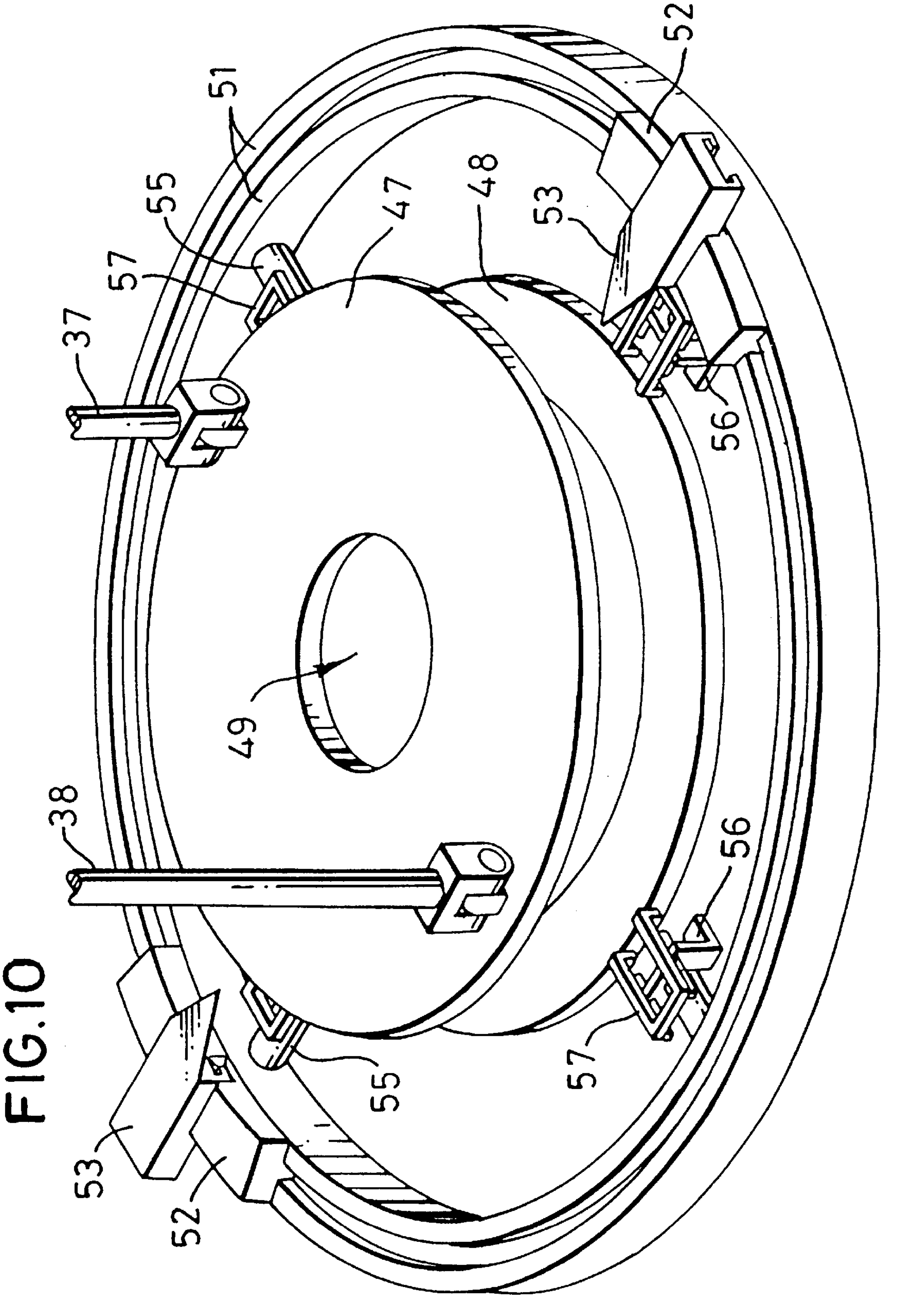
FIG. 10 is an isometric view of the tube support shown in FIGS. 1 to 9, and also of a tube-cutter, in a first position.

Once the welding has been completed, the upper part of the support is raised and tilted, as shown in FIG. 8, leaving the tube 16 bonded to the liner, so as to form an access pipe for that liner. In view of the flexible nature of the plastics material, the access pipe may fall away from the support 39, whereafter the carriage 23 is moved back to overlie the frame 17 and be re-engaged with the lower part 48 of the support (FIG. 9). The rams 55 are moved slightly outwardly so that the fingers 57 may pull the cut edge of the tube outwardly, ready for re-engagement by the gripper assembly 41. Following the lowering of the gripper assembly 41 and the gripping of the cut edge by the gripper assembly fingers 43, the clamping jaw fingers are rocked upwardly to come free of the cut edge and the clamp jaws 56 are moved radially outwardly towards the inner rail 51. The support is moved back to its tilted first position, returning the apparatus to the condition shown in FIG. 1, ready for the performance once more of the cycle of operation.

Figure 16:
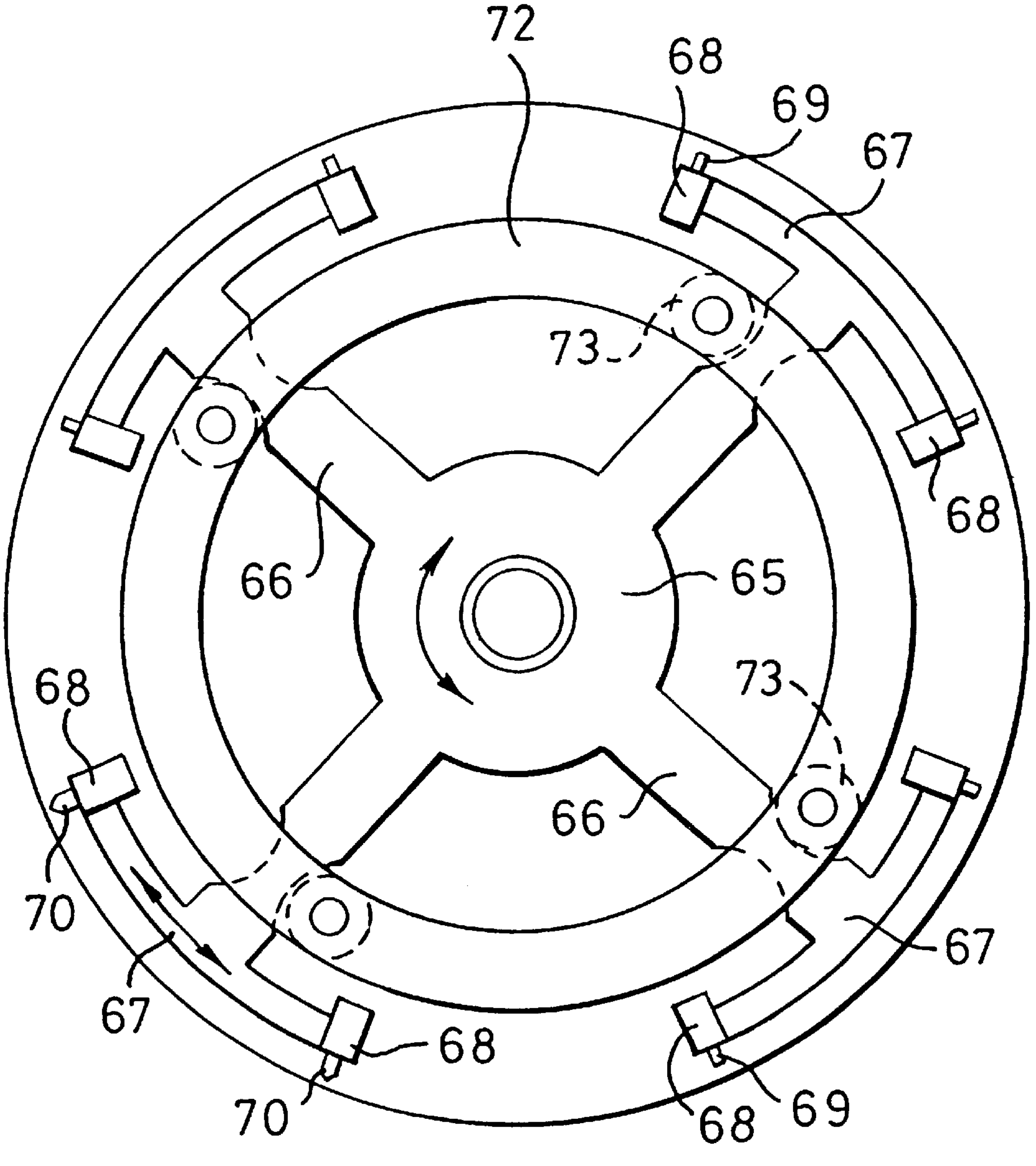
FIG. 16 is a plan view on a modified cutter arrangement, provided within the tube support.
Figure 17:
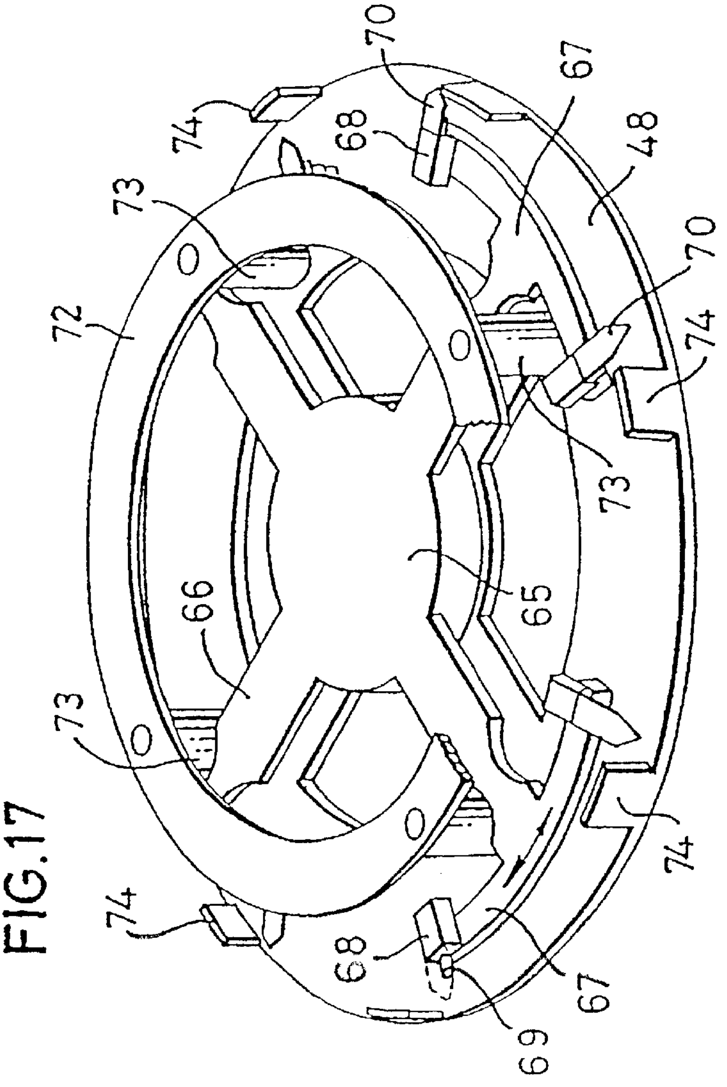
FIG. 17 is a perspective view on the cutter arrangement of FIG. 16.

Referring now to FIGS. 16 and 17, there is shown an alternative cutter arrangement to replace that shown for example in FIGS. 10 to 13. This alternative cutter arrangement is mounted on the lower part 48 of the support 39 and operates outwardly, from within the lower part. In this way, external cutter blades on the work area 18 can be eliminated.

A spider 65 is rotatably mounted on the lower part 48 of the support 39, closely to overlie that support. The spider has four arms 66 each of which carries at its radially outer end an arcuate bar 67. At each of the two ends of each bar 67 there is mounted a respective solenoid actuator 68, the armature 69 of which projects radially outwardly. Releasably mounted on each armature 69 is a respective replaceable cutter blade 70, whereby energisation of each solenoid causes all of the cutter blades 70 simultaneously to move radially outwardly, beyond the outer periphery of the lower part 48 of the support 39.

An annulus 72 is mounted on four pillars 73 on the lower part 48 and serves to connect to the upper part 47 of the support 39, for example by means of further electromagnets, as discussed above. Further, the upper part 47 may include a registration ring (not shown) to ensure correct axial alignment of the upper and lower parts 47 and 48.

As shown in the drawings, each arm 66 is cut away adjacent its respective bar 67, to permit the partial accommodation of a pillar 73. Thus, the spider 65 may move through slightly less than 90degs, the movement being limited by the pillars 73. A drive mechanism (not shown) may be provided for the spider, such as a stepper motor. Power for such a motor and also for the solenoid 68 may be supplied from the upper part of the support 39, when the upper and lower parts are connected together.

In this arrangement, the diameter of the lower part 48 advantageously is substantially equal to, or smaller than, the diameter of the tube, when opened out. Thus, the diameter of the lower part will be less than that of the upper part. Equi-spaced around the periphery of the lower part 48 are eight upstanding tabs 74, arranged so as not to be contacted by the projecting blades of the spider. Those tabs serve to support the free end of a tube, following the severing of a drawn length of the tube and the subsequent removal of that drawn length, away from the lower part 48. By supporting the free end of the tube, the engagement of that free end by the gripper fingers 43 is much facilitated. The tabs 74 could be mounted for movement generally in a radial direction, to offering of the free end of the tube to gripper fingers 43.

What is claimed is:

1. Apparatus for handling a tube of flexible plastics material drawn and then cut from a web thereof, said apparatus comprising a disc-shaped support having an axis and being of a greater diameter than the internal diameter of the tube and over which the material is drawn, and a carrier for the support, said support being mounted on the carrier for movement between a first position where the support lies at an angle to a radial plane of the tube to permit drawing of the tube thereover and a second position where the support lies substantially in a radial plane of the tube within a part thereof, said part of the tube becoming stretched over the support so as to be held thereby on movement of the support to its second position.

2. Apparatus as claimed in claim 1, wherein the carrier for the support comprises at least two arms connected to and spaced around the support, the arms being independently movable to effect movement of the support between its said positions.

3. Apparatus as claimed in claim 1, wherein the support is mounted on the carrier for movement to a third position inclined at an angle to the radial plane of the tube and beyond the second position with respect to the first position.

4. Apparatus as claimed in claim 1, wherein the support includes one of thermal welding means, chemical fusion means and adhesive dispensing means, arranged to attach a supported tube to another plastic material located at the unloading position of the support.

5. Apparatus as claimed in claim 4, wherein the support includes a cutter which cuts an opening in a sheet of a plastics material located at the unloading position of the support and to which said plastics material the tube is bonded, around the cut opening.

6. Apparatus as claimed in claim 1, wherein the carrier is mounted on a sub-frame, and the sub-frame is arranged to move the support from a loading position where the tube is drawn over the support, to a discharge position and back to the loading position.

7. Apparatus as claimed in claim 6, and further comprising a gripper mechanism associated with the sub-frame and arranged to grip the free end of a web of tube material and draw the free end over and beyond the support such that the support is located at a required position within the tube, spaced by a pre-set distance from the free end of the tube material, prior to movement of the support to its second position and the cutting of the tube from the web thereof.

8. Apparatus as claimed in claim 6, wherein a tube cutter is provided at the loading position, to cut off a length of the tube drawn over the support from a web of the tube material.

9. Apparatus as claimed in claim 8, wherein the tube cutter acts adjacent the support when in its second position, on a part of the tube which has been stretched by the support moving to its said second position.

10. Apparatus as claimed in claim 9, wherein the tube cutter comprises at least one blade arranged for rotational movement about the axis of the support when in its second position, adjacent said support.

11. Apparatus as claimed in claim 9, wherein the tube cutter comprises at least one blade carried within the support and projectable outwardly thereof, the at least one blade being mounted for rotational movement about the axis of the support.

12. Apparatus as claimed in claim 8, wherein the support comprises a disc-shaped main part and a disc-shaped auxiliary part connectable co-axially to the main part of the support and selectively releasable therefrom, the auxiliary part having a diameter no greater than that of the main part of the support.

13. Apparatus as claimed in claim 12, wherein electromagnetic means is provided on one of the main and auxiliary parts, selectively to hold together the main and auxiliary part of the support.

14. Apparatus as claimed in claim 12, wherein a clamp is provided for the auxiliary part, to maintain the position of the auxiliary part when released from the main part of the support.

15. Apparatus as claimed in claim 12, wherein the cutter acts on the web between the main and the auxiliary parts of the support, and the auxiliary part is released from the main part of the support when the main part is to be moved from the loading position, so leaving the free end portion of the web of tube material over-lying the auxiliary part.

16. A method of handling a tube of flexible plastics material using a disc-shaped support having an axis and being of a greater diameter than the internal diameter of the tube when opened out and being adjustably mounted on a carrier for movement between a first position where the support lies at an angle to a radial plane of the tube and a second position where the support lies substantially in a radial plane of the tube, in which method the support is disposed at its said first position, a length of the tube is drawn over the support from a web thereof, the support is moved to its second position so as to stretch over the support that part of the tube in which is located the support, whereby said part of the tube is held thereby, and the drawn length of the tube is cut from the web adjacent the support.

17. A method as claimed in claim 16, in which the support is moveable to a third position disposed at an angle to the radial plane and beyond the second position with respect to the first position, and to which third position the support is moved from the first position before moving to the second position.

18. A method as claimed in claim 16 in which the support comprises main and auxiliary parts, said auxiliary part being a disc of a diameter not greater than that of the main part, in which method the auxiliary part is connected to the main part and is moved therewith to the first position so that the tube may be drawn over the main and auxiliary parts, the main and auxiliary parts are moved to the second position, and then a cut to separate the drawn tube from the remainder of the web is performed between the main and auxiliary parts.

19. A method as claimed in claim 18, in which the support is moveable to a third position disposed at an angle to the radial plane and beyond the second position with respect to the first position, and to which third position the support is moved from the first position before moving to the second position.

20. A method as claimed in claim 18, in which the carrier and main part are moved away from the auxiliary part to a tube-discharge position following the cutting of the tube from the web thereof, the auxiliary part remaining within the end portion of the tube web.

21. A method as claimed in claim 20, wherein the end portion of the tube held by the main part is bonded to another plastics sheet material when the tube is moved by the main part of the support to the tube-discharge position.

* * * * *